United States Patent
Eberhart

(10) Patent No.: US 12,035,848 B2
(45) Date of Patent: Jul. 16, 2024

(54) PREPARATION JAR FOR A KITCHEN APPLIANCE, A LID FOR THE PREPARATION JAR AND A KITCHEN APPLIANCE

(71) Applicant: KONINKLIJKE PHILIPS N.V., Eindhoven (NL)

(72) Inventor: Ingolf Ronald Eberhart, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/278,151

(22) PCT Filed: Feb. 17, 2022

(86) PCT No.: PCT/EP2022/053875
§ 371 (c)(1),
(2) Date: Aug. 21, 2023

(87) PCT Pub. No.: WO2022/175358
PCT Pub. Date: Aug. 25, 2022

(65) Prior Publication Data
US 2024/0032734 A1 Feb. 1, 2024

(30) Foreign Application Priority Data
Feb. 19, 2021 (EP) ..................... 21158042

(51) Int. Cl.
*A47J 43/07* (2006.01)
(52) U.S. Cl.
CPC ....... *A47J 43/0727* (2013.01); *A47J 43/0716* (2013.01)

(58) Field of Classification Search
CPC .......................... A47J 43/0727; A47J 43/0716
USPC ........................................................ 99/357
See application file for complete search history.

(56) References Cited

U.S. PATENT DOCUMENTS

| | | |
|---|---|---|
| 5,662,032 A | 9/1997 | Baratta |
| 6,817,750 B1 | 11/2004 | Sands |
| 8,944,357 B2 * | 2/2015 | Conti .................. B01F 27/213 241/282.2 |
| 2013/0192477 A1 | 8/2013 | Hoare et al. |

(Continued)

FOREIGN PATENT DOCUMENTS

| | | |
|---|---|---|
| EP | 2394546 A1 | 12/2011 |
| EP | 2962610 A1 | 1/2016 |

(Continued)

OTHER PUBLICATIONS

Extended European Search Report issued in connection with corresponding EP Application No. 21158042.8 dated Jul. 23, 2021.

*Primary Examiner* — Dana Ross
*Assistant Examiner* — James F Sims, III
(74) *Attorney, Agent, or Firm* — Maschoff Brennan

(57) ABSTRACT

A food preparation jar has two rotary food processing tools; one at a bottom part of a vessel and one implemented by a lid. Each food processing tool is contained within the vessel which remains static in use. The lid replaces or combines with a main vessel lid to implement a second rotary food processing function, such as a juicing function, to supplement a main food processing function, such as a blending function, of the preparation jar, when mounted to a base unit of a kitchen appliance in an inverted orientation.

16 Claims, 10 Drawing Sheets

(56) References Cited

U.S. PATENT DOCUMENTS

| 2019/0167027 A1* | 6/2019 | Backus | A47J 19/027 |
| 2022/0211215 A1* | 7/2022 | Jones | A47J 43/046 |
| 2023/0000286 A1* | 1/2023 | Dziadon | A47J 43/0727 |

FOREIGN PATENT DOCUMENTS

| EP | 3586701 A1 | 1/2020 |
| KR | 101774534 B1 | 9/2017 |
| WO | 2020222661 A1 | 11/2020 |

* cited by examiner

PREPARATION JAR FOR A KITCHEN APPLIANCE, A LID FOR THE PREPARATION JAR AND A KITCHEN APPLIANCE

CROSS-REFERENCE TO RELATED APPLICATIONS

The present application is a U.S. National Phase application under 35 U.S.C. § 371 of International Application No. PCT/EP2022/053875, filed on Feb. 17, 2022, which claims the benefit of European Patent Application No. 21158042.8, filed on Feb. 19, 2021. These applications are hereby incorporated by reference herein.

FIELD OF THE INVENTION

The invention relates to kitchen appliances, and in particular it relates to appliances for performing multiple rotary processing functions, such as blending and juicing ingredients.

BACKGROUND OF THE INVENTION

There are many different food processing functions which can be implemented by a rotary tool, such as chopping, blending, sieving, juicing, whisking, stirring, beating, folding etc. Often, it is desirable to apply two or more functions in sequence to a set of ingredients as part of the food preparation.

Healthy fruit (and/or vegetable) drinks are increasingly popular, and many different types of kitchen appliance are available for blending or juicing to create these drinks.

Juicers, and more generally food processors, blenders, masticators, smoothie makers and other kitchen devices, generally perform a single food processing operation and thereby produce beverages with a particular consistency depending on the fruit or vegetable being processed.

Blenders and smoothie makers generally produce mousse or thick smoothies because they keep all fibers in the beverage by simply blending the ingredients. By adding additional fluids like water or milk, the consistency can be changed to a thin smoothie or even a fibrous juice for some fruits. A disadvantage of this process is that the beverage is often tasteless because of the dilution. Thus, a blender or smoothie maker is not typically able to extract clear juice from any ingredients. The result after the blending process always has a pulpy texture.

Masticators and centrifugal juicers generally produce mainly clear and fibrous juice consistencies by separating solid and liquid contents of the fruit or vegetables by the use of sieves and meshes. The consistency is strongly dependent on the fruit and device type.

It would be desirable to be able to perform different food processing functions with a single device, for example to choose between blending or juicing, or to perform other combinations of food processing operations, with a single appliance, and in a way which is easy for the user and simple to manufacture.

WO 2020/222661 discloses a milk maker which performs blending as well as juice separation using centrifugal forces. In one example, a preparation jar is used as a blender in one orientation, and the jar is rotatably driven in an upside-down orientation to drive solid against the inner wall of the jar and allow separated liquid to flow down for collection.

There remains a need for a safe and simple to use kitchen appliance which can perform multiple food processing tasks.

SUMMARY OF THE INVENTION

The invention is defined by the claims.

According to examples in accordance with an aspect of the invention, there is provided a preparation jar for a kitchen appliance, for mounting on a base unit of the kitchen appliance having a rotary output shaft, the preparation jar comprising:

a vessel having a bottom part and a top part, wherein the bottom part has a bottom interface for fitting the bottom part to the base unit;
a first rotary food processing tool mounted at the bottom part of the vessel;
a first rotary tool coupling for coupling the first rotary food processing tool to the rotary output shaft with the vessel in an upright orientation; and
a lid for fitting to the top part of the vessel, wherein the lid comprises:
 a second rotary food processing tool for mounting inside the vessel when the lid is fitted to the top part of the vessel; and
 a second rotary tool coupling for coupling the second rotary food processing tool to the output shaft with the vessel in an inverted orientation, during which the content of the vessel can flow to the second rotary food processing tool.

This food preparation jar comprises the combination of a vessel with a first rotary tool at the bottom, and a lid which has a second rotary tool. Thus, the preparation jar has two processing units; a first rotary tool at the bottom and a different second rotary tool at the top (when the lid is fitted).

The lid is for fitting over the top of the preparation jar, i.e. the opposite end to the location of the first rotary tool, which is the main food processing tool. The first rotary tool is for example a blending blade, which is at the bottom of the vessel of the preparation jar. By inverting the preparation jar, for example after an initial food preparation process has been performed, e.g. blending, the lid can be coupled to the base unit and a different second rotary food processing tool is then coupled to the rotary output shaft. Thus, the lid functions as a second tool so that a two-stage food processing process may be followed with a simple inversion of the preparation jar. The lid thus enables the preparation jar to have additional functionality. The lid can be in place during the processing with the first rotary tool so that there is no risk of spillage between the first and second food processing operations. The two food processing steps can be conducted without any need to change a tool and without opening the lid. The vessel can thus remain air tight and hence prevent the contents from oxidizing.

The invention provides a versatile solution in that by selecting a lid with a desired function, the functional capability of the kitchen appliance (e.g. blender) is extended to include the desired additional function. Two food processing steps can be performed by simply inverting the jar. The (second) rotary tool of the lid is positioned inside the vessel so that the operation of the device is safe in both orientations of the preparation jar, with the vessel static.

The lid for example comprises a static housing which rotatably receives the second food processing rotary tool, and at least one of:

a first coupling means for coupling the lid, such as the static housing of the lid, to the base unit; and second coupling means for coupling the lid, such as the static housing of the lid, to the vessel.

Thus, the vessel connects to the lid, and the lid (and its connected vessel) connects to the base unit.

The second coupling means for example implements a locking mechanism to couple the lid to the vessel. Because the vessel is inverted to make use of the lid, a sealed and locked fitting to the vessel is desired.

The locking mechanism for example comprises a bayonet fitting. Thus, a twist and lock function is implemented to fit the lid to the vessel. The locking instead simply be a threaded connection.

The preparation jar may further comprise a funnel for directing the contents of the vessel to the second rotary food processing tool when the vessel is in the inverted orientation. The funnel for example directs the content to a preferred location relative to the second rotary tool. The funnel may be connected to or connectable to the lid and/or to the vessel.

The preparation jar may further comprise an outlet for delivering ingredient that has been processed by the second rotary food processing tool. Preferably, the outlet is arranged such that processed ingredients may be dispensed from the preparation jar without the need for the user to remove the lid. The outlet may for instance be provided in the lid so that processed ingredients may be dispensed from the preparation jar using the lid.

A manually operable valve is for example coupled to the outlet. This enables a user to choose when to dispense the processed ingredients. Thus, in this example, the valve is part of the preparation jar, for example the lid. However, a valve may be formed as part of the base unit instead.

The preparation jar may further comprise a gearbox which interfaces between the rotary output shaft and the second rotary food processing tool. In such a case, the rotary output shaft may be driven at a speed suitable for a first process (of the main food processing tool of the preparation jar, e.g. blender) and the gearbox converts this into a rotation speed more suitable for the second rotary food processing tool, for example with a speed reduction. The gearbox may for instance form part of the lid. Alternatively, the gearbox may be configured as a separate module that can be mounted between the rotary output shaft and the second rotary food processing tool, when desired.

In one example, the second rotary food processing tool comprises a rotary sieve, and with the vessel in an inverted orientation, the content of the vessel can flow to a central inner region of the rotary sieve.

In this example, the lid functions as a centrifugal juicer, for extracting juice from the already present contents of the vessel, by pressing through the sieve by centrifugal force. The lid thus functions as a juicing lid, and enables a two stage blending and then juicing process to be followed with a simple inversion of the preparation jar. The use of a rotary sieve means a large volume of juice output can be obtained with high quality.

The rotary sieve for example comprises a cylindrical or conical drum having a perforated outer drum wall. By spinning the drum, ingredient is forced through the perforations, thereby to implement centrifugal filtering, and hence a juicing process.

The perforations of the wall of the drum for example have a diameter in the range 0.5 mm to 1 mm. The perforations for example have a diameter of around 0.8 mm. The perforations may be circular, but they could be any desired shape, in which case the "diameter" may be considered to be the largest linear dimension of a perforation opening.

The lid for example comprises a juice collection chamber in fluid communication with an outer region of the sieve. The sieved juice may be collected or it may dispensed from the preparation jar while it is being generated. The collection chamber for example has a volume of less than 1500 ml, including the internal volume of the sieve which itself is for example less than 800 ml.

The preparation jar may further comprise a second lid for closing the top part of the vessel. Preferably, the second lid has a feed opening for feeding content to the vessel. This second lid may be used to feed ingredients for blending into the vessel. The vessel and second lid may form a conventional blender.

Thus, the preparation jar may be used as a normal blender jar if desired when the first rotary tool is a blending blade.

In one example, the second lid has the same coupling to an open top of the vessel as the lid with the second rotary tool, so that they are used interchangeably. The lid with the second rotary tool and the second lid are thus used alternately to close the top part of the vessel.

Alternatively, the lid with the second rotary tool is attachable to the second lid. For example, it may fit to the feed opening. In this case, there may be a modular lid assembly.

As mentioned above, the lid may include a funnel for guiding ingredient to the rotary food processing tool. Such a funnel, or other guide arrangement, may instead form part of the vessel.

The vessel may have a volume of at least 1500 ml, for example a volume of 2000 ml. It may for example be used as a blender and juicer for large amounts of ingredient.

The invention also provides a lid for fitting to the top part of a vessel of a preparation jar for a kitchen appliance, wherein the preparation jar is for mounting on a base unit of the kitchen appliance having a rotary output shaft, wherein the lid comprises:

a rotary sieve for mounting inside the vessel when the lid is fitted to the top part of the vessel; and a sieve coupling for coupling the rotary sieve to the output shaft with the vessel in an inverted orientation, during which the content of the vessel can flow to the rotary sieve.

This is a particular design of the lid which implements a rotary sieve for juice extraction. It may thus be provided over the preparation jar of a blender to implement a two stage blending and juicing process.

The lid for example has the features defined above, such as:

a static housing which rotatably receives the rotary sieve;

a first coupling means for coupling the lid, such as the static housing of the lid, to the base unit; and second coupling means for coupling the lid, such as the static housing of the lid, to the vessel.

The lid may comprise a funnel for directing the contents of the vessel to the sieve when the vessel is in the inverted orientation.

The lid may comprise an outlet for delivering ingredient that has been processed by the rotary sieve and optionally a manually operable valve coupled to the outlet. A gearbox may be provided which interfaces between the rotary output shaft and the rotary sieve. The rotary sieve for example comprises a cylindrical or conical drum having a perforated drum wall. A juice collection chamber may be in fluid communication with an outer region of the rotary sieve.

The invention also provides a food preparation device, comprising:

a base unit with a motor and an output shaft driven by the motor;

a controller for controlling the motor; and the preparation jar defined above.

The controller is for example adapted:

in a first mode to operate the motor with a speed in the range 2000 rpm to 25000 rpm to drive the first or second rotary food processing tool; and optionally in a second mode to increase the rotation speed of the motor to a maximum speed over a time of at least 5 seconds, wherein the maximum speed is in the range 2000 rpm to 3500 rpm.

The first mode may for instance be a blending mode, in which the motor drives the first rotary food processing tool. The second mode may for instance be a juicing mode, in which the motor drives the second rotary food processing tool.

Thus, different motor drive functions may be applied for different processes, such as a blending process and a juicing process.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
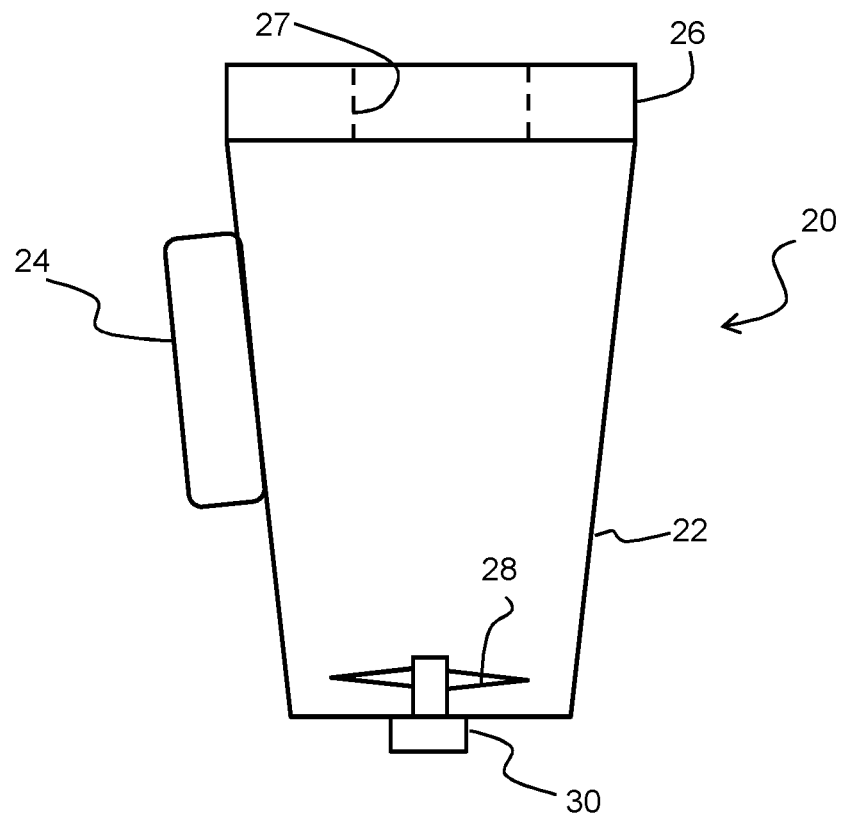
FIG. 1 shows a conventional blender with a separated base unit and preparation jar.
Figure 1:
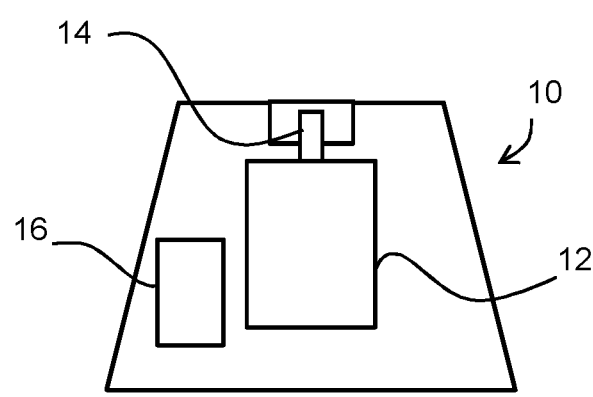

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

FIG. 1 shows a conventional blender, comprising a base unit 10 and a preparation jar 20. They are shown separated from each other in FIG. 1.

The base unit 10 comprises a motor 12 and an output shaft 14 driven by the motor. The motor is controlled by a controller 16. The motor for example is a 1400 to 1500 Watt motor with a maximum speed of 25,000 rpm.

The preparation jar 20 comprises a vessel 22 with a handle 24 and a lid 26. The lid 26 for example has a feed opening 27 to allow ingredients to be placed in the vessel. A closure fits into the opening 27, with surrounding rubber lips to assure a sealed blending process.

At the bottom part of the vessel 22 is a first rotary food processing tool 28, which in the case of a blender is a blending blade 28. A first rotary tool coupling 30, in this case a blade coupling 30, is used to couple the blade 28 to the rotary output shaft 14, when the preparation jar is mounted on the base unit 10 in its main upright orientation.

The bottom part of the vessel may be considered to be the opposite end (in a vertical direction) to the end at which ingredients are introduced into the vessel. Thus, the vessel has an open top to allow ingredients to be added, and a closed bottom at which the blade is mounted.

The blade 28 may be removable from the bottom part of the vessel for example with a locking ring. The blade has a desired 3D geometry to optimize blending results. Many different blade designs are possible which can be removably exchanged with the blade 28. The whole bottom part of the vessel may instead be removable from a remainder of the vessel as a unit, with the blade permanently attached to the unit (i.e. not to be detached for cleaning).

The bottom part of the vessel has a bottom interface (not shown) for fitting the bottom part of the preparation jar, i.e. the bottom part of the vessel 22, to the base unit 10. This may for example be a bayonet coupling, by which the preparation jar is attached to and removed from the base unit, in order to couple the two together and also make a coupling between the rotary output shaft 14 and the blade, via the blade coupling 30.

Any suitable coupling and interface arrangements may be used for the attachment of the vessel 22 to the base unit 10 and for the coupling of the rotation of the shaft to the blade, and they may be entirely conventional.

Figure 2:
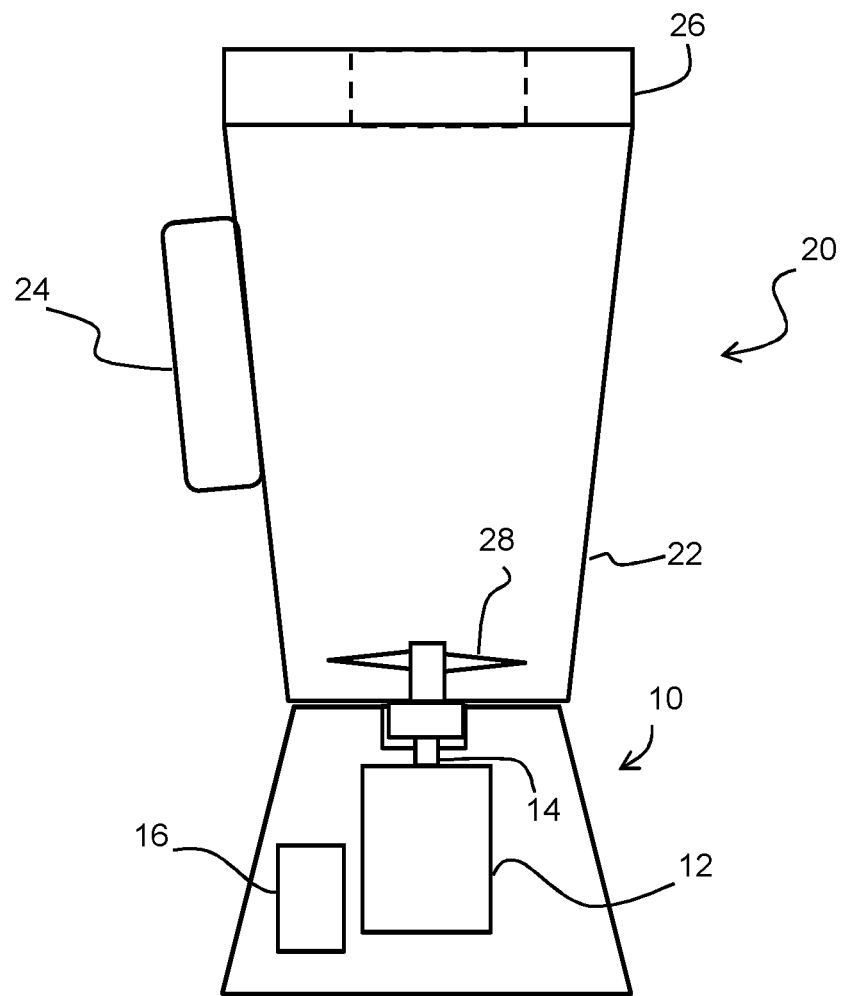
FIG. 2 shows the blender of FIG. 1 with the preparation jar attached to the base unit.

FIG. 2 shows the blender of FIG. 1 with the preparation jar attached to the base unit.

The invention provides a food preparation jar with two rotary food processing tools; one at the base of the vessel 22 and one implemented by a lid. Each food processing tool is contained within the vessel which itself remains static in use. The invention also provides a lid which replaces or combines with the main lid 26 to implement a second rotary food processing function, such as a juicing function, to supplement a main food processing function, such as a blending function, of the preparation jar. This second function is implemented when the preparation jar is mounted to the base unit in an inverted orientation.

The invention will be described with reference to an example in which the main food processing function is a blending function and the additional food processing function is a juicing function. However, other main functions and other alternative additional food processing functions are possible, as discussed further below.

Figure 3:
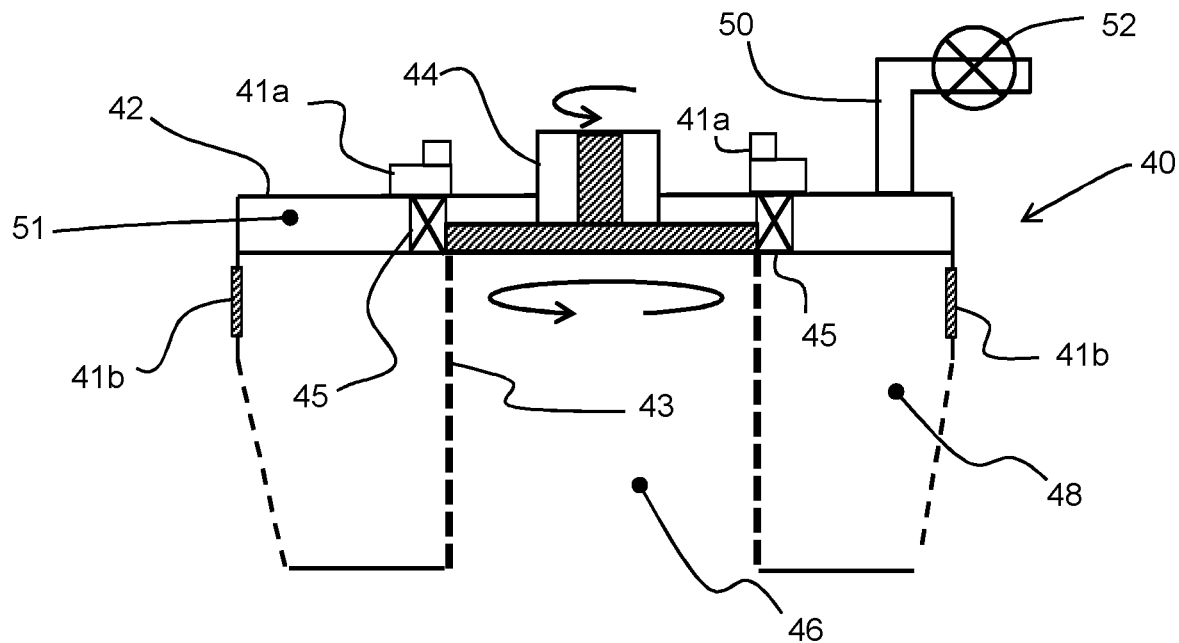
FIG. 3 shows a lid for fitting to the top part of the vessel to perform a juicing function.

FIG. 3 shows the lid 40, for fitting to the top part of the vessel 22. The lid 40 comprises a first coupling means 41a for coupling the lid 40 to the base unit. In particular, the first coupling means 41a is for fixing a static housing 42 of the lid to the base unit 10. The first coupling means 41a functions as lid interface to the base unit and has the same design as the bottom interface at the bottom of the vessel (not shown), but the first coupling means 41a is at the top of the lid in the orientation shown in FIG. 3. There is additionally a second coupling means 41b for attaching the lid to the vessel. Each of the first and second coupling means 41a, 41b comprises coupling features.

The second coupling means 41b includes a locking mechanism to couple and lock the lid 40 to the vessel 22. This matches a coupling between the normal blending lid 26 and the vessel, so that the two lids 26,40 are interchangeable in this example. The locking mechanism for example comprises a bayonet fitting. Thus, a twist and lock function is implemented to fit the lid to the vessel. A screw thread may instead be used.

In another example, explained further below, there may be a modular lid assembly which can be configured as the normal blending lid or as the juicing lid.

It is noted that the terms "top" and "bottom" are used with reference to the orientation of FIG. 3, even when the preparation jar is inverted. Thus, the "top" of the lid 40 is the side facing away from the main volume of the vessel onto which the lid is to be mounted, and the "bottom" of the lid 40 is the side facing into the vessel.

Figure 5:
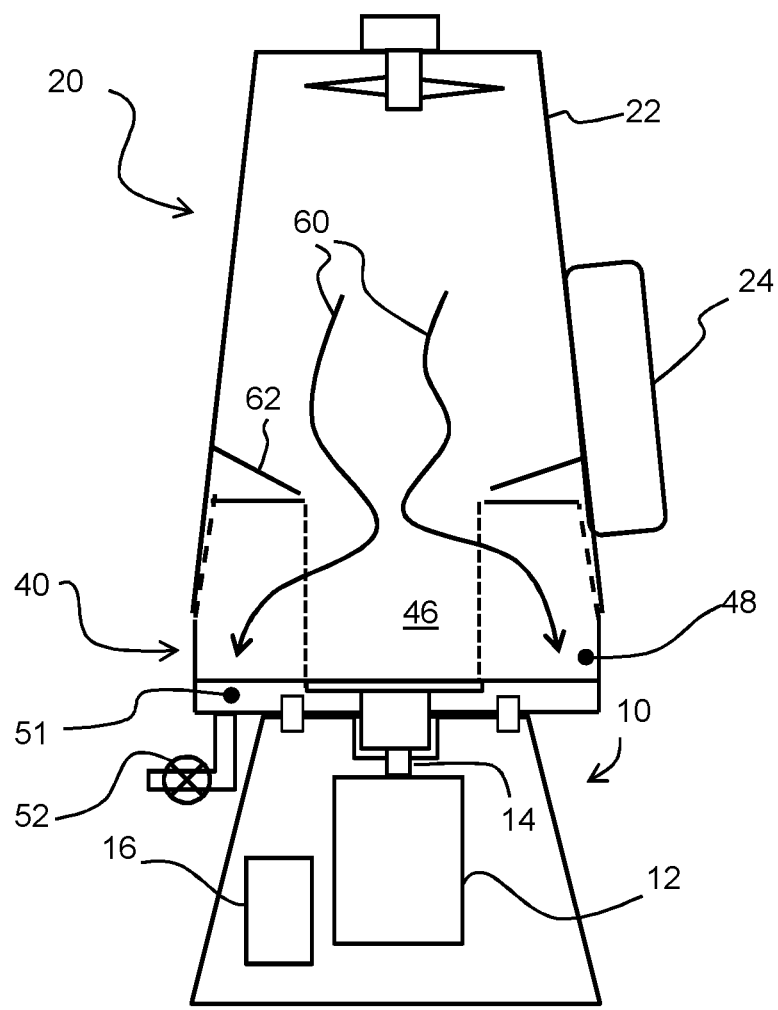
FIG. 5 shows the preparation jar of FIG. 4 attached to the base unit.

Thus, the top of the lid may be fitted to the base unit 10 (as shown in FIG. 5) when the preparation jar is inverted so that the top of the lid faces downwardly.

This particular example of the lid has a rotary sieve 43 and a second rotary tool coupling 44, in this case a sieve coupling 44, for coupling the rotary sieve 43 to the rotary output shaft, when the vessel is in the inverted orientation and attached to the base unit 10. The static housing 42 is around the top of the rotary sieve, so that the rotary sieve rotates within the static housing. The bottom of the rotary sieve projects downwardly from the lid. Bearings 45 are shown schematically to support the sieve and allow it to rotate while the main static housing of the lid remains stationary. The rotating parts of the lid are thus all internal, and the parts that are to form the external surface, e.g. to mate with the base unit, are static.

The sieve coupling 44 has a corresponding design to the blade coupling 30, so either coupling may couple to the rotary output shaft of the motor.

The rotary sieve 43 is firmly held in place relative to the remainder of lid, for example using a locking ring. Thus, the rotary sieve is fixed in translational position relative to the vessel but can rotate about a vertical rotation axis. The rotary sieve is a cylindrical drum (although it could be conical instead of cylindrical) with a central inner region 46 internally of the drum and an outer region 48 radially outside the sieve wall. The central inner region 46 is open at the bottom (in the orientation of FIG. 3). There may however be a coarse mesh over the open bottom.

The drum has a perforated outer drum wall. The perforations for example have maximum opening size, e.g. diameter, of around 0.8 mm, for example in the range 0.5 mm to 1 mm. The drum for example has a diameter in the range 80 mm to 150 mm, such as around 120 mm or more particularly 135 mm, and a height in the range 25 mm to 60 mm, such as around 40 mm or more particularly 50 mm. The lid is for example a plastic component but with a stainless steel drum.

The lid has an outlet 50 coupled to the outer region 48 of the sieve. A juice collection chamber 51 may be defined between the outer region 48 of the sieve and the outlet 50, so that extracted juice may be collected. The volume is for example less than 1500 ml since this may represent a maximum amount of juice to collect from ingredients corresponding to the overall capacity of the vessel. This overall capacity is for example more than 1500 ml, such as 2000 ml. The sieved juice may be collected for later dispensing or it may dispensed from the preparation jar while it is being generated.

A valve 52 such as a tap is provided to enable the controlled release of juice from the outlet.

Figure 4:
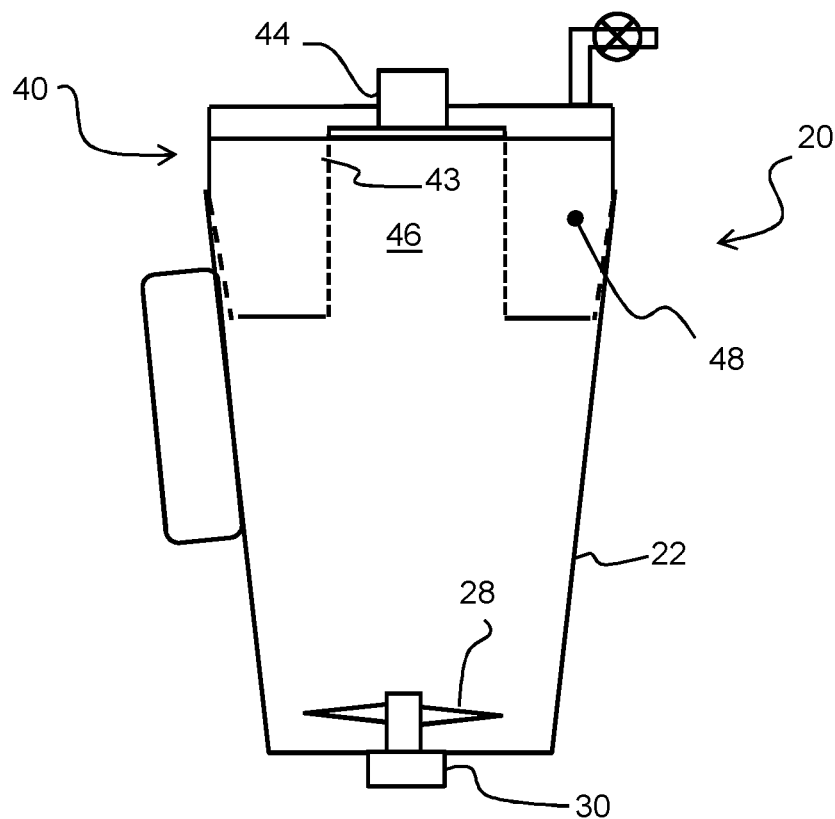
FIG. 4 shows a preparation jar with the lid of FIG. 3 fitted to the top of the vessel.

FIG. 4 shows the preparation jar 20 with the lid 40 fitted to the top of the vessel 22. In this example, the rotary sieve 43 extends downwardly into the volume of the vessel 22. However, the lid could instead sit entirely over the top of the vessel 22.

FIG. 4 shows the lid 40 as a replacement for the lid 26. However, it is noted that in an alternative example, the juicing lid 40 may be fitted over or into the normal lid 26. The lid 40 may for example be formed as an insert to mount into the opening 27.

In such a case, there may be considered to be a single modular lid unit. The normal lid 26 may be divided into a static outer portion, that may correspond to the static housing 42, and a removable center portion, such that the opening 27 is formed in the lid. The removable center portion may be removed and replaced with a corresponding portion of the lid 40 (the rotary sieve 43 and sieve coupling 44).

There may alternatively only be the lid 40. Ingredients can be added to the vessel by removing the lid 40. The presence of the sieve (or other tool implemented by the lid) during the blending process does not affect the blending process.

In all cases, the lid is fitted over the top of the vessel hence at the opposite end to the first rotary food processing tool, i.e. blending blade 28 in this example, which is at the bottom of the vessel. By inverting the preparation jar, for example after an initial blending has been performed, the lid can be coupled to the base unit via the lid interface (the first coupling means 41a) and the rotary sieve is then coupled to the rotary output shaft via the sieve coupling 44.

The lid functions as a centrifugal juicer, for extracting juice from the blended contents of the vessel.

FIG. 5 shows the preparation jar attached to the base unit 10 in the inverted position. The blade remains in place. The handle 24 is for example centrally positioned in the height direction so that it is comfortable for both orientations. When the preparation jar is inverted, the content (which is typically blended fruits and/or vegetables) will flow into the central inner region 46 of the rotary sieve, as shown by arrows 60. The ingredients are urged against the rotary sieve by the centrifugal forces and liquid (and very fine pulp) is forced through the perforations, where it collects in the collection chamber.

The top of the vessel (which may be plastic or glass) is shown wider than the base unit, to make the juice collection easier. The top opening of the vessel may also be widened further (instead of the straight walls schematically shown) to increase the size of the collection chamber.

The liquid may be fully contained by the lid, if it forms a fully closed structure. However, an inner wall of the vessel 22 may instead define an outer periphery of the collection chamber. For example, a bottom wall of the lid (when in the orientation of FIG. 3, i.e. the uppermost part shown in FIG. 5) may seal around the inner surface of the vessel, so that the lid does not need to define an outer wall. In such a case, there is no need for an outer wall (the wall shown hatched in FIGS. 3 and 5).

FIG. 5 shows that the vessel 22 has a guide member 62 for guiding the content of the vessel to the central inner region 46 of the rotary sieve. The guide member is for example an annular sloped wall forming a funnel which extends inwardly from the inner wall of the vessel. Thus, when the vessel is inverted, the content flows into the central area of the rotary sieve. When the rotary sieve is driven, the centrifugal juicing takes place between the central inner region and the outer region through the sieve.

The guide member may instead be part of the lid, or else the bottom wall of the lid (with reference to the orientation of FIG. 3) may be sloped to function as a guiding surface.

The connection between the preparation jar and the base unit preferably allows the controller in the base unit to know the orientation of the preparation jar, so that suitable control settings may be automatically set. For example, the base unit may have two switches, one of which is actuated by the preparation jar, depending on the orientation. The lid interface 41a and the bottom interface (of the bottom of the vessel) may be slightly different to enable the controller to identify the jar orientation, but the basic mechanical coupling is the same.

The controller 16 of the base unit may have different modes of operation for the different functions (e.g. blending and juicing). A blending mode for example operates the blender blade with a rotational speed in the range 2000 rpm to 25000 rpm to drive the blade. Different speed settings are for example possible within this range. A juice extraction mode may involve a progressive increase in rotation speed of the rotary sieve, for example over a time period of at least 5 seconds, to a maximum rotational speed in the range 2000 rpm to 3500 rpm.

Thus, different motor drive functions may be applied for a blending process and for a juicing process, or more generally for different first and second food processing functions.

FIGS. 1 to 5 show the food preparation device in schematic form.

Figure 6:
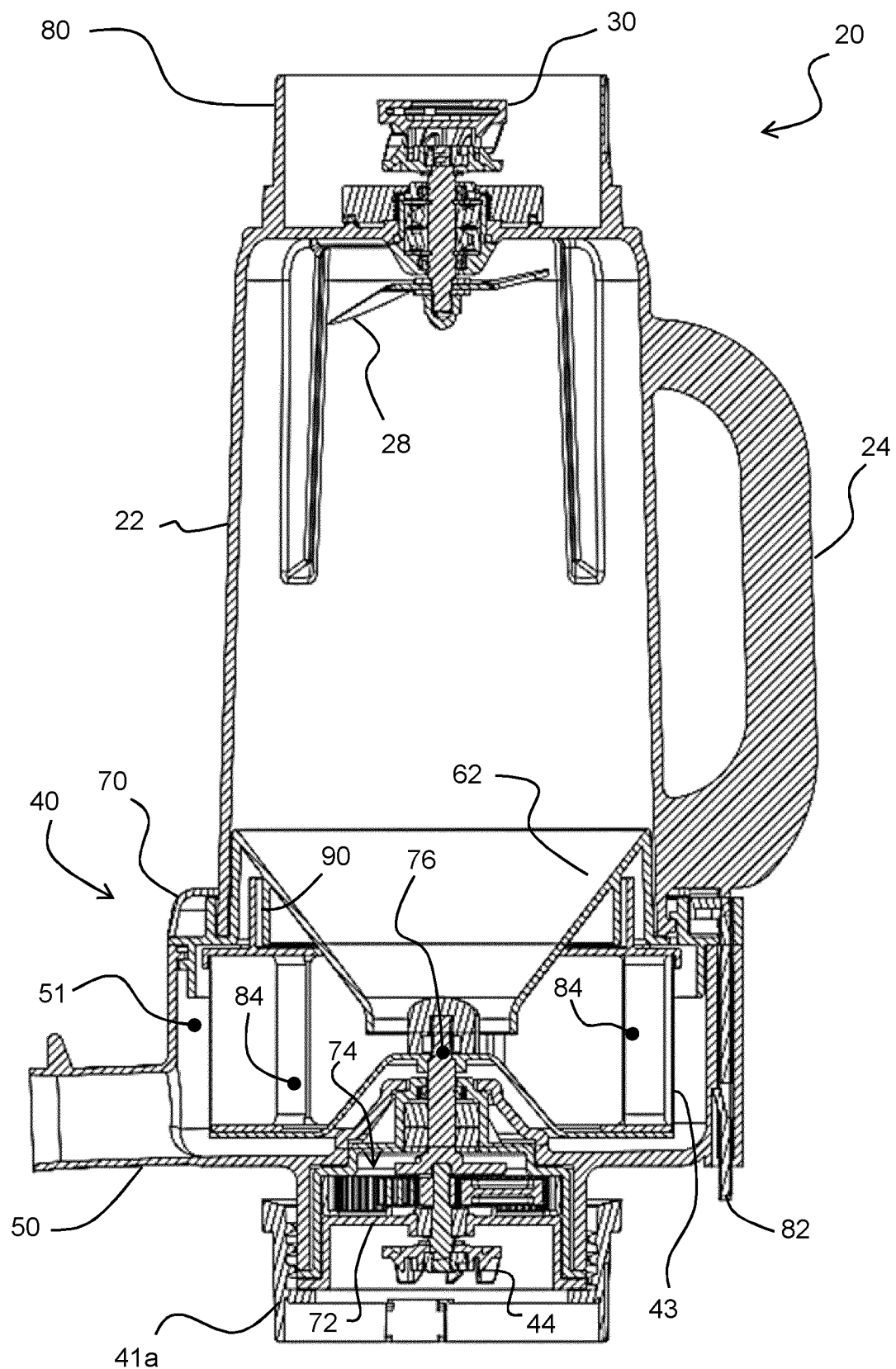
FIG. 6 shows a more detailed example of a food preparation jar.

FIG. 6 shows a more detailed example of a food preparation jar in the inverted orientation, again with a rotary sieve 43 implemented by the lid 40. FIG. 6 shows a cross section.

As explained above, the lid 40 comprises a static part within which the sieve 43 rotates. The static part comprises a main outer housing 70 which defines the juice collection chamber 51, a funnel which functions as the guide member 62, and a gearbox housing 72 which houses a gearbox 74.

The main outer housing 70 connects to the open end of the vessel 22 for example with a bayonet or threaded coupling as mentioned above. This connection is formed by the second coupling means 41b.

The gearbox connects to a drive pin 76 of the sieve and also to the rotary output shaft of the base unit. The gearbox is used for speed reduction for example from 25000 rpm to 2000 rpm. However, motor speed control may instead avoid the need for a gearbox.

The main outer housing 70 also defines the first coupling means 41a for coupling the lid (and its attached vessel) to the base unit. The first coupling means 41a has a corresponding design to the bottom interface 80 at the bottom of the vessel 22, which is for coupling the bottom of the vessel 22 to the base unit, as described above.

The different parts preferably can be disassembled. For example, the gearbox 74 and drive pin 76 of the sieve can preferably be separated so that all parts can be cleaned. This is done prior to cleaning or putting the sieve, funnel and the main housing in a dishwasher.

The funnel 62 in this example is also a separate part which is connected to the sieve and the juice collection chamber. One end of the funnel is for example connected to the vessel by a bayonet coupling, and the main housing of the lid may then connect to the other end of the funnel by another bayonet coupling. The user may thus assemble the funnel and the main housing of the lid (with the sieve within the overall lid structure), and then connect that assembled unit to the vessel.

The static part of the lid thus comprises three parts in this example, namely the main outer housing 70, the funnel 62 and the first and second coupling means 41a, 41b, and these parts are separate and modular. They may however instead be formed as an integral unit. The funnel is optional and the flow direction function may instead be formed by the geometry of the vessel.

In this example, a safety bar 82 is engaged when the parts are all assembled. This safety bar interacts with the base unit so that only when all parts are correctly assembled can the device be operated.

The lid may incorporate a drip stop (valve) function. This is a valve which is closed when the preparation jar is disconnected from the base unit, to prevent leakage. When the preparation jar is mounted to the base unit, the valve opens or is opened manually, to allow juice to be extracted from the outlet 50.

The sieve 43 has a cleaning member 84 mounted within the central region of the sieve. The cleaning member comprises an annular ring with a set of radial studs facing radially inwardly.

Figure 7:
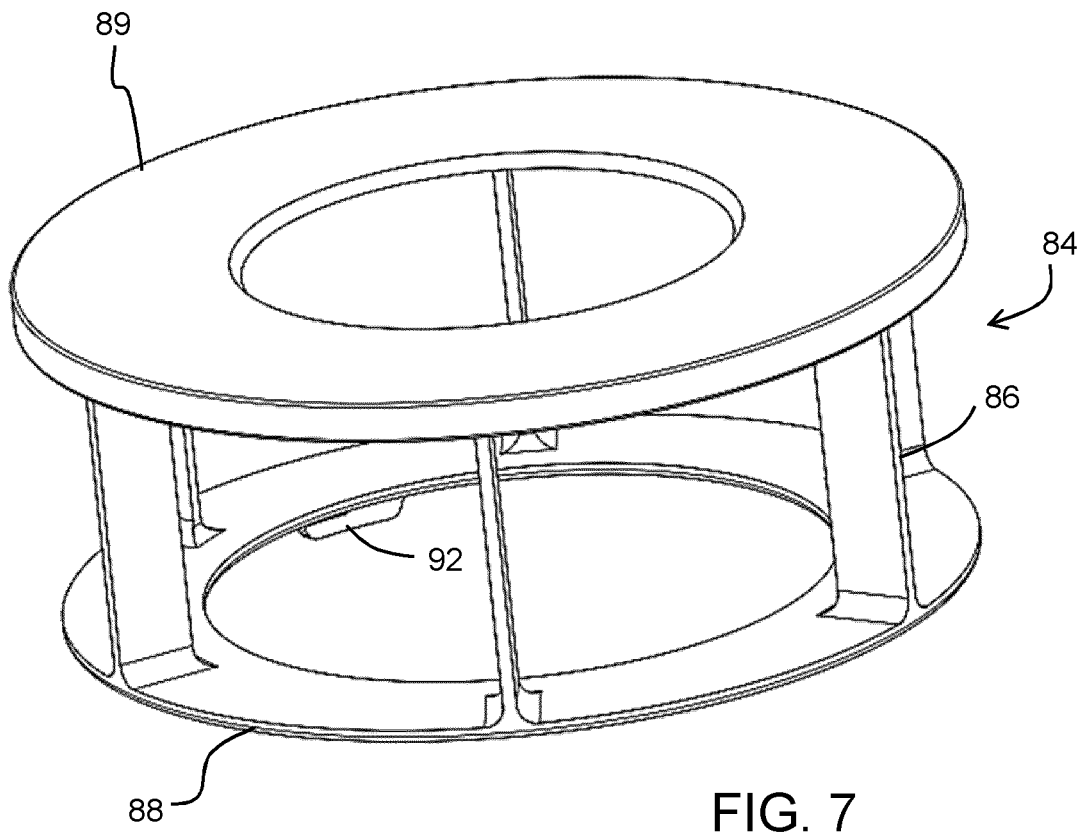
FIG. 7 shows a first example of a cleaning member which may be used in the food preparation jar of FIG. 6.

FIG. 7 shows a first example of the cleaning member 84 more clearly. It comprises a cylinder with an open outer periphery between radial studs 86. The cleaning member 84 sits inside the drum of the sieve and has a flange 88 at the bottom and a flange 89 at the top (where "bottom" and "top" relate to the orientation of FIG. 5 in this case).

Feet 92 in form of hooks are for coupling the cleaning member 84 to the sieve after it has been inserted. The cleaning member rotates with the sieve.

The top flange 89 helps to make sure that the splashing during rotation of the sieve stays inside the sieve and does not end up in the collection chamber (bypassing the sieve perforations).

Figure 8:
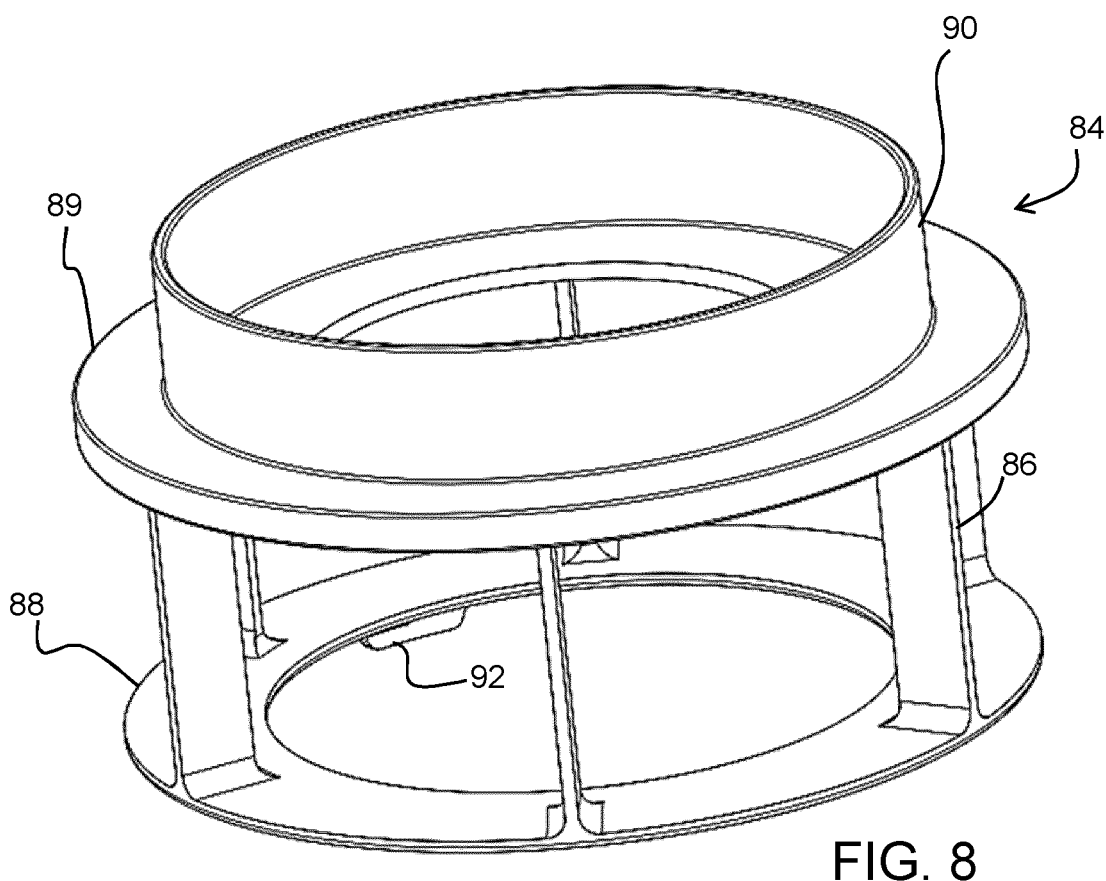
FIG. 8 shows a modification to the design of FIG. 7 of the cleaning member which may be used in the food preparation jar of FIG. 6.

FIG. 8 shows a modification to the design of FIG. 7, in which the top flange 89 has an annular ring 90 on top (when in the inverted orientation of the preparation jar) which functions as one continuous sealing leg. The annular ring 90 reaches up to the funnel 62 to make sure that a labyrinth is created which prevents any overload of blended ingredient exiting the funnel and thus escaping from the gap between the funnel and the sieve.

The design of FIG. 8 is used in the example of FIG. 6, and the annular ring 90 is shown in FIG. 6, forming a band that reaches and seals the cleaning member against the underside of the funnel so that the funnel and the flange 89 act as a barrier between the sieve and the main volume of the vessel.

Thus, FIG. 8 shows an annular cleaning member which is adapted to fit within the inner space of a rotary sieve. It comprises a set of radially extending studs 86. The studs may extend parallel to the axis of rotation of the drum as shown, but they may be offset from the parallel direction. The studs 86 are each connected at one end to a first connecting flange 88 and at an opposite end to a second connecting flange 89, thus defining a rigid cylindrical (or conical) structure. This structure can be screwed into and out of the inner space of the rotary sieve. In this example, one of the connecting flanges 89 has a projecting ring 90. The ring 90 projects to an underside of a funnel in order to create a closed barrier.

The cleaning member 84 is used to dislodge collected pulp when it is unscrewed.

Figure 9:
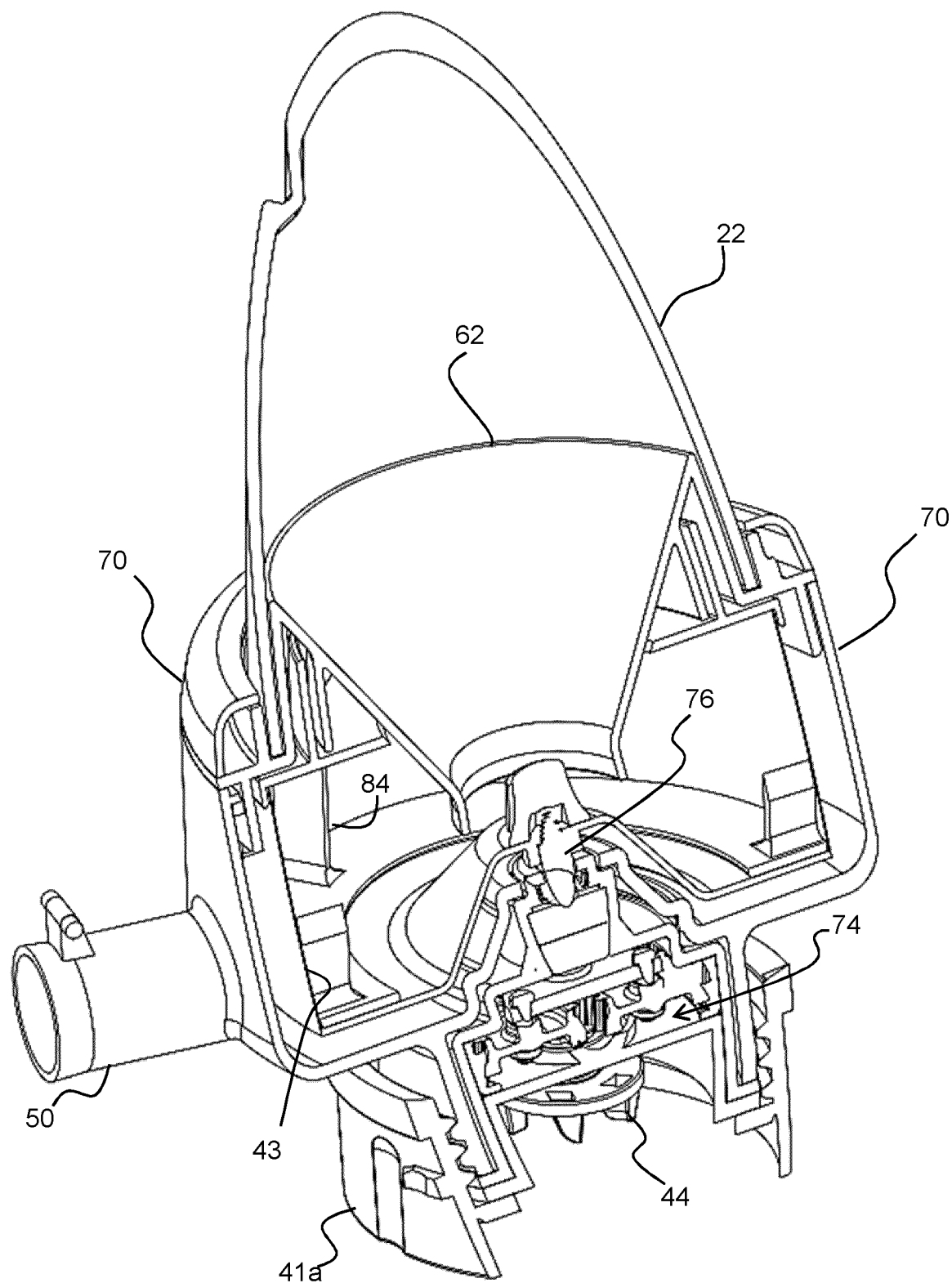
FIG. 9 shows a cutaway perspective view of the food preparation jar of FIG. 6.

FIG. 9 shows a cut away perspective view of the design of FIG. 6.

Figure 10:
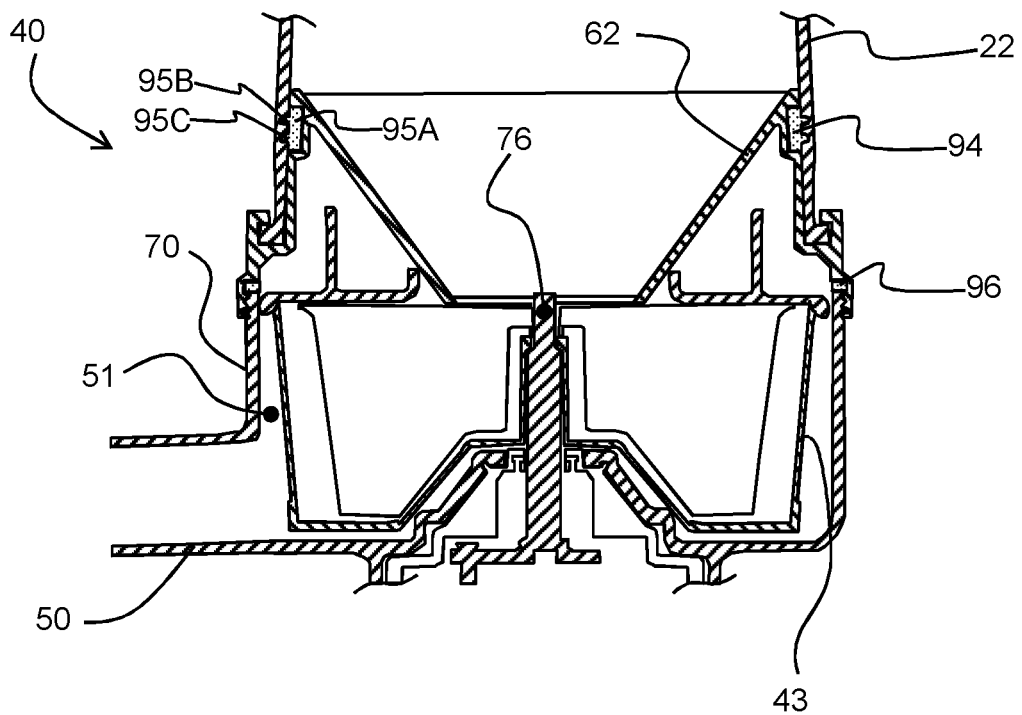
FIG. 10 shows a part of a preparation jar according to another example.

FIG. 10 shows a part of a preparation jar according to another example. The preparation jar is in the inverted orientation in the view provided in FIG. 10. Many of the features of the preparation jar shown in FIG. 10 are the same as those described above and hence a description of these features will not be repeated, for the sake of brevity only.

It is noted that whilst the embodiment shown in FIG. 6 includes a sieve 43 in the form of a cylindrical drum, this is not intended to be limiting. An alternative is shown in FIG. 10 in which the sieve 43 takes the form of a conical drum in which an inclined side wall of the conical drum causes the drum to be wider proximal to the vessel 22 and (correspondingly) narrower proximal to the base unit 10 when the lid 40 is attached thereto.

FIG. 10 also shows a seal 94 arranged to provide a seal between the funnel 62 and the vessel 22.

The seal 94 may assist to minimise the risk of leakage of the contents of the vessel 22 between the vessel 22 and the funnel 62.

Such a seal 94 may, for example, comprise a main annular component 95A and one or more annular protrusions 95B, 95C arranged to protrude from a surface of the main annular component in the direction of the vessel 22 when the funnel 62 and the vessel 22 are connected to each other. Two annular protrusions 95B, 95C are evident in the non-limiting example shown in FIG. 10.

The seal 94 may be arranged at or towards an end of the funnel 62, as shown in FIG. 10.

Alternatively or additionally, a further seal 96 may be arranged to provide a seal between the funnel 62 and the main outer housing 70.

Thus, the further seal 96 may assist to minimise the risk of juice leaking out from the juice collection chamber 51 to the exterior of the preparation jar.

The further seal 96 may be arranged at an opposite end of the funnel 62 to the end at (or towards) which the seal 94 is arranged, as shown in FIG. 10.

The seal 94 and the further seal 96 can be made of any suitable material provided that the material can assist in restricting juice passage between the relevant components of the lid 40. For example, the seal 94 and the further seal 96 are formed of silicone rubber.

Figure 11:
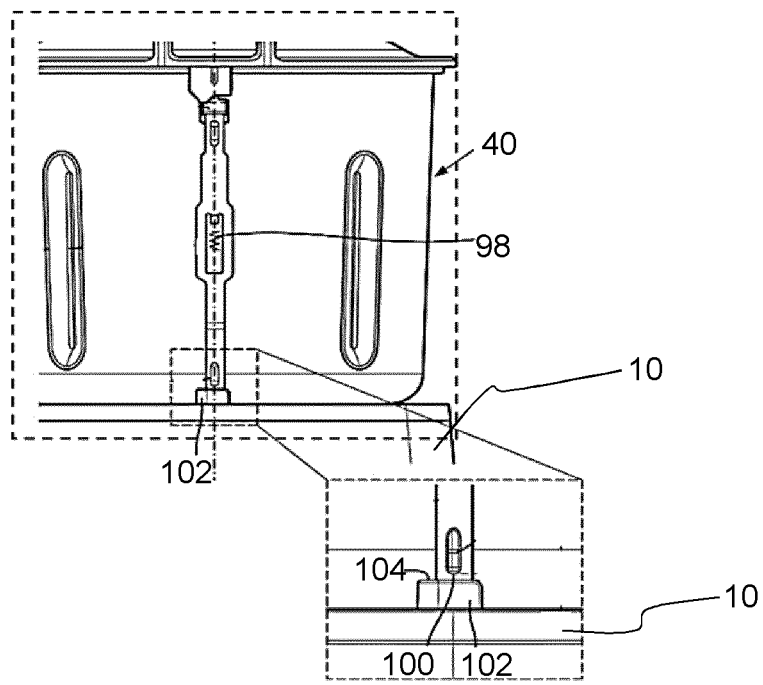
FIG. 11 shows a safety switch mechanism of a preparation jar according to still another example.

Whilst the embodiment shown in FIG. 6 includes the safety bar 82 protruding from the lid 40 to interact with a mating surface of the base unit 10, this is not intended to be limiting. An alternative design can be seen in FIG. 11 in which the lid 40 has a safety switch contact rod 98 comprising a mating surface 100 that engages with a protrusion 102 on the base unit 10. The protrusion 102 itself has a mating surface 104 that engages with the mating surface 100 of the safety switch contact rod 98 when the lid 40 is connected to the base unit 10. This engagement may result in actuation of a switch, or otherwise cause an electrical connection to be established, which permits operation of the electrically powered components of the device provided that the vessel 22 and the lid 40 are assembled correctly. With this arrangement, the safety switch contact rod 98 can be at least partially hidden within, so as to minimise its protrusion out from, the lid 40, in contrast with the safety bar 82 shown in FIG. 6.

Figure 12A:
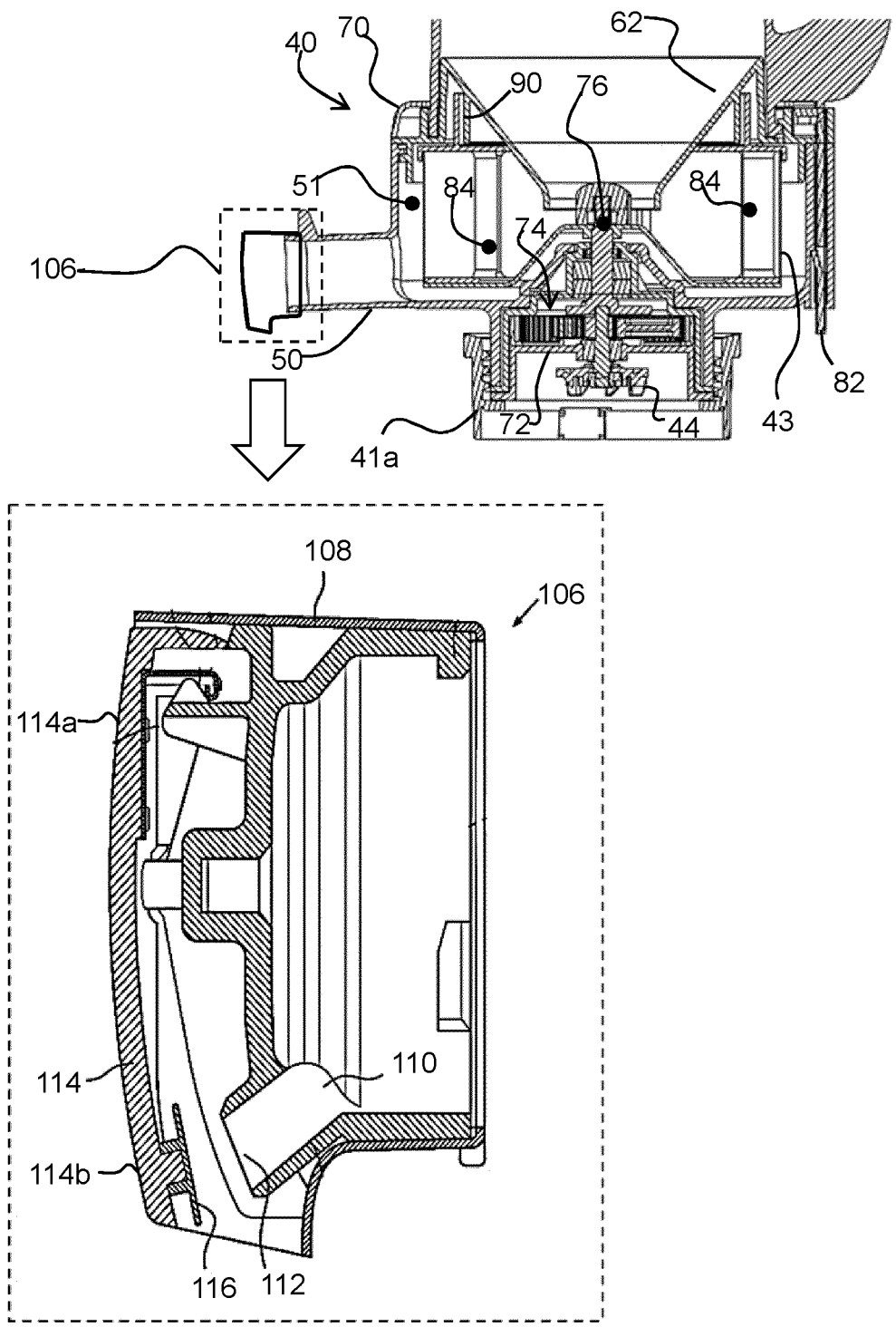
FIGS. 12A and 12B show a drip-stop component of a preparation jar according to yet another example.
Figure 12B:
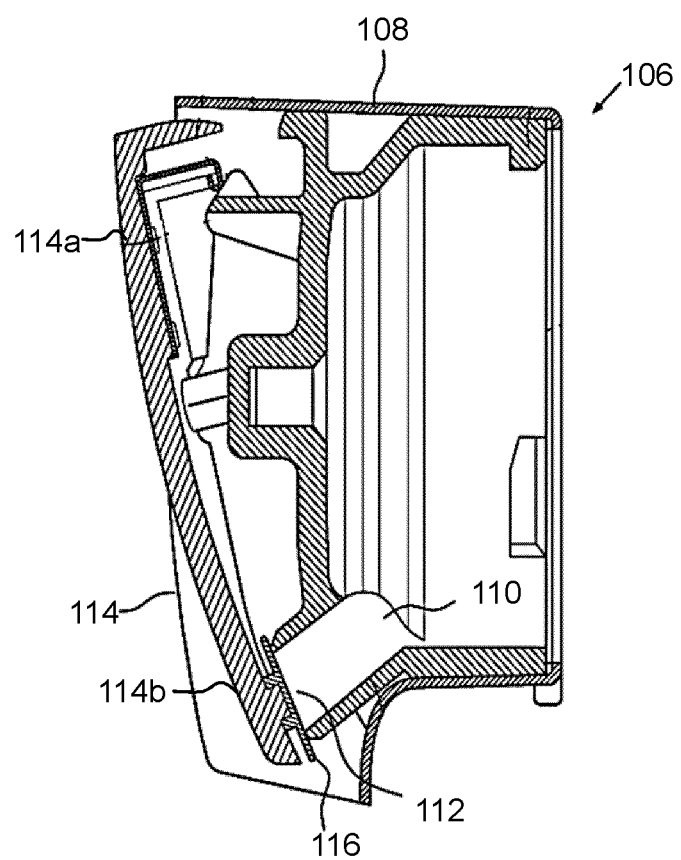

FIG. 12A and FIG. 12B show an example of a drip-stop attachment 106 that can be used with the lid 40 of the preparation jar described herein. The drip-stop attachment 106 provides a mechanism for blocking or allowing the flow of juice from the juice collection chamber 51, through the outlet 50 and into an external storage vessel, such as a tumbler or carafe. The drip-stop attachment 106 includes a housing 108 which houses a liquid inlet 110 and a liquid outlet 112, and extends around a flap 114. The flap 114 is hinged such that it toggles the drip-stop attachment 106 between an open and a closed position. To cause the drip-stop attachment 106 to move from the closed position to the open position, the user exerts a force on an upper portion 114a of the flap 114. To cause the drip-stop attachment 106 to move from the open position to the closed position, the user exerts a force on a lower portion 114b of the flap 114. FIG. 12A shows the drip-stop attachment 106 in an open position where flow of juice is allowed from the juice collection chamber 51, into the liquid inlet 110 and through liquid outlet 112 where the liquid exits the drip-stop attachment 106. FIG. 12B shows the drip-stop attachment 106 in a closed position where a sealing element 116 attached to an internal side of the flap 114 aligns with and seals against the liquid outlet 112, thus preventing liquid from flowing out of the drip-stop attachment 106.

It is noted, for the avoidance of doubt, that the sealing-, safety-, and drip-stop-related functionality described above are provided as non-limiting examples, and various alternative ways of implementing such functionality can be contemplated, for example using one or more alternatively arranged silicone seals, safety functions, and locking features.

To use the food preparation device, the preparation jar is mounted in the standard orientation over the base unit and the preparation jar is locked to the base unit. The jar is fed with chosen ingredients, for example peeled and roughly cut oranges. The jar is closed with the standard lid. The normal blending process is then carried out (e.g. following a recipe book). When the blending is complete, the standard lid is unlocked and removed. The lid of the invention is then mounted and locked to the vessel.

The lid of the invention may instead be fitted to the standard lid, or indeed it may already have been fitted during the blending process. The lid of the invention may instead be fitted at the start and be in place during blending. In this case, the vessel remains sealed throughout the two processes.

The complete preparation jar is then removed from the base unit and is inverted and relocked to the base unit. The blended ingredients (oranges in this example) flow to the central region of the drum since the now upward facing part of the lid is open to the central region. This flow is optionally guided by a part of the vessel or lid, and juice from the blended ingredients is driven through the sieve. The juice collects in the collection chamber around and below the drum and juice can be collected by opening the valve. The preparation jar can be easily disassembled for cleaning.

The example above is based on an implementation of a rotary sieve. However, the lid may be used to implement any rotary food processing tool, such as cutting, blending, mixing, grinding, separating, or spinning.

For example, the rotary tool implemented by the lid could be a mixing or stirring element. After blending with the blending blade (the first processing tool), the preparation jar is inverted to mix the blended ingredients in order to prevent separation using the mixing or stirring element (the second processing tool). The drive to the mixing or stirring tool could be automatically switched on and off for certain periods to mix and stir intermediately, for example if the user would like to prevent separation of the blend for a longer time.

The second processing tool may be detachable from the static part of the lid so that second tool can be cleaned and optionally also exchanged with another type of processing tool. There may thus be multiple lid designs that can increase further the range of functions, such as a stirrer to circulate e.g. infused water, or an egg-whisk to beat egg whites to a fluffy consistency.

The first tool does not have to be a blending blade. The arrangement may be used to combine any desired two rotary food processing tools.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A preparation jar for a kitchen appliance, to mount on a base unit of the kitchen appliance having a rotary output shaft, the preparation jar comprising:
   a vessel having a bottom part and a top part, wherein the bottom part has a bottom interface to fit the base unit;
   a first rotary food processing tool mounted at the bottom part of the vessel;
   a first rotary tool coupling to couple the first rotary food processing tool to the rotary output shaft with the vessel in an upright orientation; and
   a lid to fit to the top part of the vessel, wherein the lid comprises:
      a second rotary food processing tool to mount inside the vessel when the lid is fitted to the top part of the vessel; and
      a second rotary tool coupling to couple the second rotary food processing tool to the rotary output shaft with the vessel in an inverted orientation, during which content of the vessel flows to the second rotary food processing tool.

2. The preparation jar of claim 1, wherein the first rotary food processing tool is a blending blade.

3. The preparation jar of claim 1, wherein the lid further comprises a static housing which rotatably receives the second rotary food processing tool, and at least one of:
   a first coupling to couple the static housing of the lid to the base unit; and
   a second coupling to couple the static housing of the lid to the vessel.

4. The preparation jar of claim 1, further comprising a funnel to direct the content of the vessel to the second rotary food processing tool when the vessel is in the inverted orientation.

5. The preparation jar of claim 1, further comprising an outlet to deliver an ingredient that has been processed by the second rotary food processing tool.

6. The preparation jar of claim 5, further comprising a manually operable valve coupled to the outlet.

7. The preparation jar of claim 1, further comprising a gearbox which connects the rotary output shaft of the base unit and a drive pin of the second rotary food processing tool.

8. The preparation jar of claim 1, wherein the second rotary food processing tool comprises a rotary sieve, and wherein, with the vessel in the inverted orientation, the content of the vessel flows to a central inner region of the rotary sieve.

9. The preparation jar of claim 8, wherein the rotary sieve comprises a cylindrical or conical drum having a perforated drum wall.

10. The preparation jar of claim 8, wherein the lid comprises a juice collection chamber in fluid communication with an outer region of the rotary sieve.

11. The preparation jar of claim 1, further comprising a second lid to close the top part of the vessel having a feed opening to feed the content to the vessel.

12. The preparation jar of claim 11, wherein:
   the lid is attachable to the second lid; or
   the lid and the second lid are usable alternately to close the top part of the vessel.

13. The preparation jar of claim 1, wherein the lid further comprises:
   a rotary sieve to mount inside the vessel when the lid is fitted to the top part of the vessel; and
   a sieve coupling to couple the rotary sieve to the rotary output shaft with the vessel in the inverted orientation, during which the content of the vessel flows to the rotary sieve.

14. A food preparation device, comprising:
   a base unit with a motor and a rotary output shaft driven by the motor;
   a controller to control the motor; and
   the preparation jar of claim 1.

15. The food preparation device of claim 14, wherein the controller is adapted
   in a first mode to operate the motor with a speed in a range 2000 rpm to 25000 rpm to drive the first or second rotary food processing tool.

16. The food preparation device of claim 14, wherein the controller is adapted in a second mode to increase a rotation speed of the motor to a maximum speed over a time of at least 5 seconds, wherein a maximum speed is in a range 2000 rpm to 3500 rpm.

* * * * *